United States Patent [19]

Canfield et al.

[11] Patent Number: 5,699,695
[45] Date of Patent: Dec. 23, 1997

[54] SPATIAL, PARALLEL-ARCHITECTURE ROBOTIC CARPAL WRIST

[75] Inventors: Stephen L. Canfield, Newport; Charles F. Reinholtz, Blacksburg; Robert J. Salerno, Radford; Anthony J. Ganino, Blacksburg, all of Va.

[73] Assignee: Virginia Tech Intellectual Properties, Inc., Blacksburg, Va.

[21] Appl. No.: 641,402

[22] Filed: May 1, 1996

[51] Int. Cl.$^6$ ................................................ B25J 17/02
[52] U.S. Cl. ...................... 74/490.06; 414/729; 901/28; 901/29
[58] Field of Search .................. 74/490.06; 901/28, 901/29; 414/729, 735

[56] References Cited

U.S. PATENT DOCUMENTS

| | | | |
|---|---|---|---|
| 125,880 | 4/1872 | Clemens . | |
| 125,881 | 4/1872 | Clemens . | |
| 4,651,589 | 3/1987 | Lambert | 901/28 X |
| 4,806,068 | 2/1989 | Kohli et al. | 414/735 |
| 4,819,496 | 4/1989 | Shelef | 74/89.15 X |
| 4,848,179 | 7/1989 | Ubhayakar | 901/28 X |
| 4,976,582 | 12/1990 | Clavel | 901/23 X |
| 5,156,062 | 10/1992 | Appleberry | 901/15 X |
| 5,333,514 | 8/1994 | Toyama et al. | 901/23 X |
| 5,378,282 | 1/1995 | Pollard | 901/23 X |
| 5,419,674 | 5/1995 | Chang | 901/29 X |
| 5,420,489 | 5/1995 | Hansen et al. | 901/29 X |

FOREIGN PATENT DOCUMENTS

| | | |
|---|---|---|
| 0 009 447 | 4/1980 | European Pat. Off. . |
| 1437-211-A2 | 11/1988 | U.S.S.R. . |
| 1445-945-A1 | 12/1988 | U.S.S.R. . |
| 1668784-A1 | 8/1991 | U.S.S.R. . |

OTHER PUBLICATIONS

B. Padmanabhan et al., "Closed–Form Inverse Kinematic Analysis of Variable–Geometry Truss Manipulators," *Journal of Mechanical Design*, vol. 114, Sep. 1992, pp. 438–443.

*Primary Examiner*—Allan D. Herrmann
*Attorney, Agent, or Firm*—Oliff & Berridge

[57] ABSTRACT

A spatial parallel-architecture robotic Carpal wrist is shown. The structure of the robotic Carpal wrist allows for the application of a closed-form solution to the kinematic problem of determining all of the possible inputs to the actuators that result in a desired end orientation of the distal plate. The robotic Carpal wrist has a structure including a base plate, a distal plate and six equal length links connecting the base plate to the distal plate with the six links being arranged in three chains of two links each and with three actuators being mounted in fixed relationship to the base plate. The three actuators cause the three links connected to the base plate to each pivot with a single degree-of-freedom relative to the base plate. Each of the three chains of links includes a three degree-of-freedom joint between its two links. The distal plate is connected to three of the links with the connection between the distal plate and each of the three links allowing a single degree-of-freedom between the distal plate and each of the three links.

19 Claims, 6 Drawing Sheets

SPATIAL, PARALLEL-ARCHITECTURE ROBOTIC CARPAL WRIST

BACKGROUND OF THE INVENTION

1. Field of the Invention

The present invention relates to a spatial, parallel-architecture, multiple degree-of-freedom robot wrist, sometimes referred to hereinafter as a robotic Carpal wrist because of the similarities in the structural and operational characteristics of the robotic Carpal wrist to the carpus of human anatomy. More specifically, the invention relates to a robotic Carpal wrist having a base plate and a distal plate coupled together by three symmetric, parallel chains of links, wherein each of the chains consists of five revolute joints in series, the first two being perpendicular and having intersecting axes, the second through fourth intersecting at a point, and the fourth and fifth again perpendicular and having intersecting axes, and wherein a closed form solution, or a solution based on analytical expressions, is available to solve the kinematics of the wrist.

2. Related Art

Existing devices for moving and positioning elements in space include robotic wrists that are constructed with serial chains of alternating links and joints. Serial manipulators require each link of the chain to support the entire load as well as the weight of all links further out along the chain. In order to maintain the strength and stiffness of these serial wrists, the wrist members are quite heavy, reducing the payload capability of the manipulator. Furthermore, such serial manipulators necessitate the location of driving elements at the level of each axis of the chain thus resulting in a heavy and complicated configuration for the transmission of motion to the axes of the manipulator. Consequently, in existing manipulators, even when moving small loads, large masses must be set in motion.

Alternatively, parallel manipulators, in which control of orientation is effected by a set of elements acting in parallel, provide the advantage of having multiple members to share support of the load, and, can have all driven members connected to ground allowing ground-relative driving input. However, parallel manipulators have the distinct disadvantage of requiring complex and counter-intuitive solutions to the kinematics of the devices. A forward kinematic analysis of a robotic wrist involves determining the orientation and position of an element supported by the wrist when given a set of inputs to the actuators of the wrist. An inverse kinematic analysis of a robotic wrist involves determining the inputs to the actuators of the wrist in order to obtain a desired position and orientation of an element supported by the wrist. The complexity of the calculations required to solve both the forward and inverse kinematic analyses of parallel type manipulators may preclude the use of such devices without a closed form solution or sufficient computational speed to carry out numerical approximations.

A manipulator is considered solvable if all sets of possible actuator inputs can be determined by an algorithm given an end position and orientation of an element supported by the manipulator. Manipulator solution strategies are generally classified into two broad classes: closed form solutions and numerical solutions. Because of their iterative nature, numerical solutions are usually much slower than the corresponding closed form solutions. "Closed form" means a solution method based on analytical expressions or on the solution of a polynomial of degree 4 or less, such that non-iterative calculations suffice to arrive at a solution.

The problem of determining the required inputs to the actuators of a parallel manipulator in order to obtain a desired end position of an element supported by the manipulator has been recognized in the prior art. The architecture of completely general parallel manipulators has prevented the application of closed form solutions to such inverse kinematic analyses of the wrists. The structure of many existing parallel manipulators has necessitated iterative, numerical solutions to both the forward and inverse kinematic analyses of the manipulators. Such iterative numerical solutions are much slower than corresponding closed-form solutions, and hence lack utility for many applications.

U.S. Pat. No. 4,976,582 to Clavel discloses an industrial robot that enables the control of three degrees of freedom of a movable member in parallel from actuators arranged on a fixed support, while preserving parallelism of the moving member with respect to the fixed support. Clavel discloses a parallel type robotic manipulator for moving an element in space in translation only. The device includes a base member, a movable member, and three actuators, each of which comprises one fixed portion and one moving portion. The fixed portion of each actuator is integral with the base member, and the moving portion of each is connected to the movable member by way of a linking member. Each of the linking members is mounted at a first end by a joint having two degrees of freedom onto the moving portion of the actuator and mounted at the second end by a joint having two degrees of freedom onto the movable member. The joints used to connect the linking member to the moving portion of the actuator and to the movable member are referred to as Cardan-type couplings. The Clavel manipulator is asymmetric about its mid-plane.

The Clavel manipulator moves its output member such that it stays parallel to its base member at all times. Therefore, the output motion from the Clavel robot is translatory only, in three independent directions, x translation, y translation, and z translation. However, the Clavel manipulator cannot cause an orientational change of its moving member with respect to its base member. A robotic wrist is a device required to orient an object, in order to add the necessary orientational freedom to a robot system. Therefore, the Clavel device, since it cannot create any orientational change, would not be used as a robotic wrist.

SUMMARY OF THE INVENTION

The present invention defines a new geometry for a spatial, parallel-architecture, robotic Carpal wrist. The Carpal wrist consists of two rigid plates, referred to as the basal and distal plates, coupled together by links and joints forming three, five-revolute chains. The first two revolute axes in this chain are perpendicular, the second through fourth intersect at a point, and the fourth and fifth are again perpendicular. The three intersecting revolute axes can generally be replaced with a single spheric joint. However, it is believed that the all-revolute design will lead to an increased range of motion, improved reliability, and superior precision of the robotic Carpal wrist. Although a number of possible geometries for the Carpal wrist exist, the preferred configuration of the present invention includes each of the three chains having two equal length links joined together by a mid-joint that allows three degrees of freedom between the links. One of the two links in each of the three chains is joined to the basal plate by a revolute joint allowing a single degree-of-freedom relative to the basal plate; and the other of the two links in each chain is joined to the distal plate by a revolute joint allowing a single degree-of freedom relative to the distal plate. The three mid-joints define the midplane, that forms a plane of symmetry for the robotic Carpal wrist. Similarities between the robotic Carpal wrist and the carpus of human anatomy include the structure of a group of proximal links connected to a group of distal links to form parallel chains of links with an open tunnel defined between the parallel chains. Actuation of the proximal or basal links in the robotic Carpal wrist causes a change in the orientation of the distal plate relative to the basal plate similarly to the way that muscular actuation of the Carpal bones in a human causes a change in the orientation of the human hand relative to the forearm.

Actuation of the three basal revolute joints in the robotic Carpal wrist controls movement of the distal plate relative to the basal plate. The wrist is capable of producing pitch and yaw motions in excess of 180 degrees combined with a third plunging motion. The plunging motion is defined as an extension along the primary axes of the wrist, or, axes normal to the basal and distal plates. A fourth degree-of-freedom may be added in the form of a revolute joint on the distal plate to accommodate tasks requiring orientation of the end-effector about an axis perpendicular to the distal plate.

One embodiment of the present invention includes a robotic Carpal wrist having a parallel configuration, with a basal plate, a distal plate, three actuators or actuating means located at the basal plate, and three parallel chains of linking members. Each of the three chains of linking members comprises two linking members joined together by a three degree-of-freedom joint. All of the links in the three parallel chains are of equal length, and one end of each of the chains is pivotally attached to the basal plate by a joint having a single degree of rotational freedom, while the opposite end of each of the chains is pivotally attached to the distal plate by another joint having a single degree of rotational freedom. The three degree-of-freedom joints joining the two links in each of the parallel chains lie on a common mid-plane, and the robotic Carpal wrist is physically symmetrical about that mid-plane.

One advantage of the robotic Carpal wrist of the present invention is that its configuration allows for the three actuators that control movement of the links connected to the basal plate to be remotely actuated. This allows the robotic Carpal wrist drive actuators to be located away from the wrist, back on the robot frame, ultimately allowing for higher payloads and/or higher velocity and acceleration capabilities of the manipulator since the mass of the wrist is minimized, and thus minimizing its inertia. As an added benefit of the parallel architecture, power may be transmitted directly to the joints without passing through any previous joints. This is because all input members are directly connected to the basal plate of the wrist. This problem of power transmission in common wrists is usually addressed with differentials, concentric shafts, and similar mechanically complicated devices, that must transmit power through intermediate joints.

A further advantage of the present invention is that the wrist configuration provides an open framework that serves as a shielded conduit. This is an important consideration for tasks which utilize tooling with hoses, or large bundles of control or instrumentation cables. In such applications, the instrumentation cables can be passed through the center of the robotic Carpal wrist, similar to the way in which veins and nerves pass through the Carpal tunnel of the human carpus, thus being surrounded and protected by the three parallel chains of links.

Pivotal connections between one end of each of the three parallel chains of links and the basal plate, and between the other end of each of the parallel chains of links and the distal plate, are referred to as revolute joints since they allow for a single degree of rotational freedom between the members that they join. The axes of rotation of the three revolute joints at the basal plate define a triangle lying on the plane of the basal plate. Similarly the axes of rotation of the revolute joints at the distal plate define a triangle lying on the plane of the distal plate. The three degree-of-freedom mid-joints that join the two links in each of the chains of links comprise three revolute joints having co-intersecting axes of rotation. The centers of each of these mid-joints are defined as the point of intersection of each of these three axes of rotation. The centers of the mid-joints define the mid-plane of the manipulator. The mid-plane forms a plane of symmetry for the robotic Carpal wrist of the present invention. The robotic wrist is symmetrical about the mid-plane since the reflection of the base plate, basal revolutes, and basal legs (links attached to the base) through the symmetric mid-plane is identical to the distal plate, distal revolutes, and distal legs.

The symmetrical configuration of the robotic Carpal wrist of the present invention allows for a closed form solution to both the forward kinematic problem and the inverse kinematic problem of the wrist. A solution to the forward kinematic problem of the robotic wrist enables the calculation of the end orientation of a tool supported by the wrist when given input values to be provided by the actuators of the wrist. A solution to the inverse kinematic problem of the wrist enables the calculation of the input values for the actuators of the wrist when given a desired end orientation of a tool supported by the wrist.

BRIEF DESCRIPTION OF THE DRAWINGS

The invention is better understood by reading the following Detailed Description of the Preferred Embodiments with reference to the accompanying figures, in which like reference numerals refer to like elements throughout, and in which.

DETAILED DESCRIPTION OF THE PREFERRED EMBODIMENTS

Figure 5:
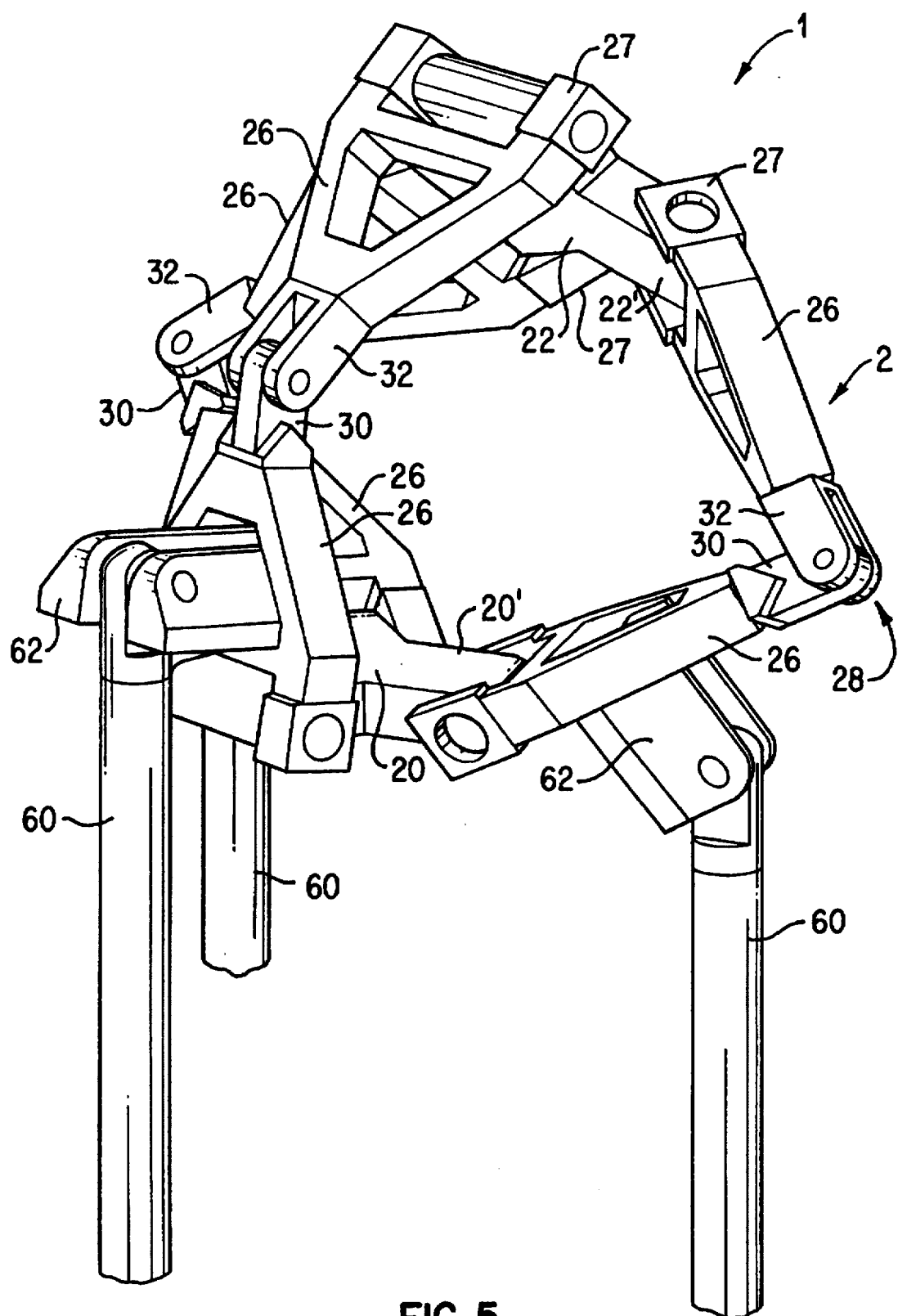
FIG. 5 illustrates an embodiment of the robotic Carpal wrist of the present invention wherein the wrist is actuated to a first position.
Figure 6:
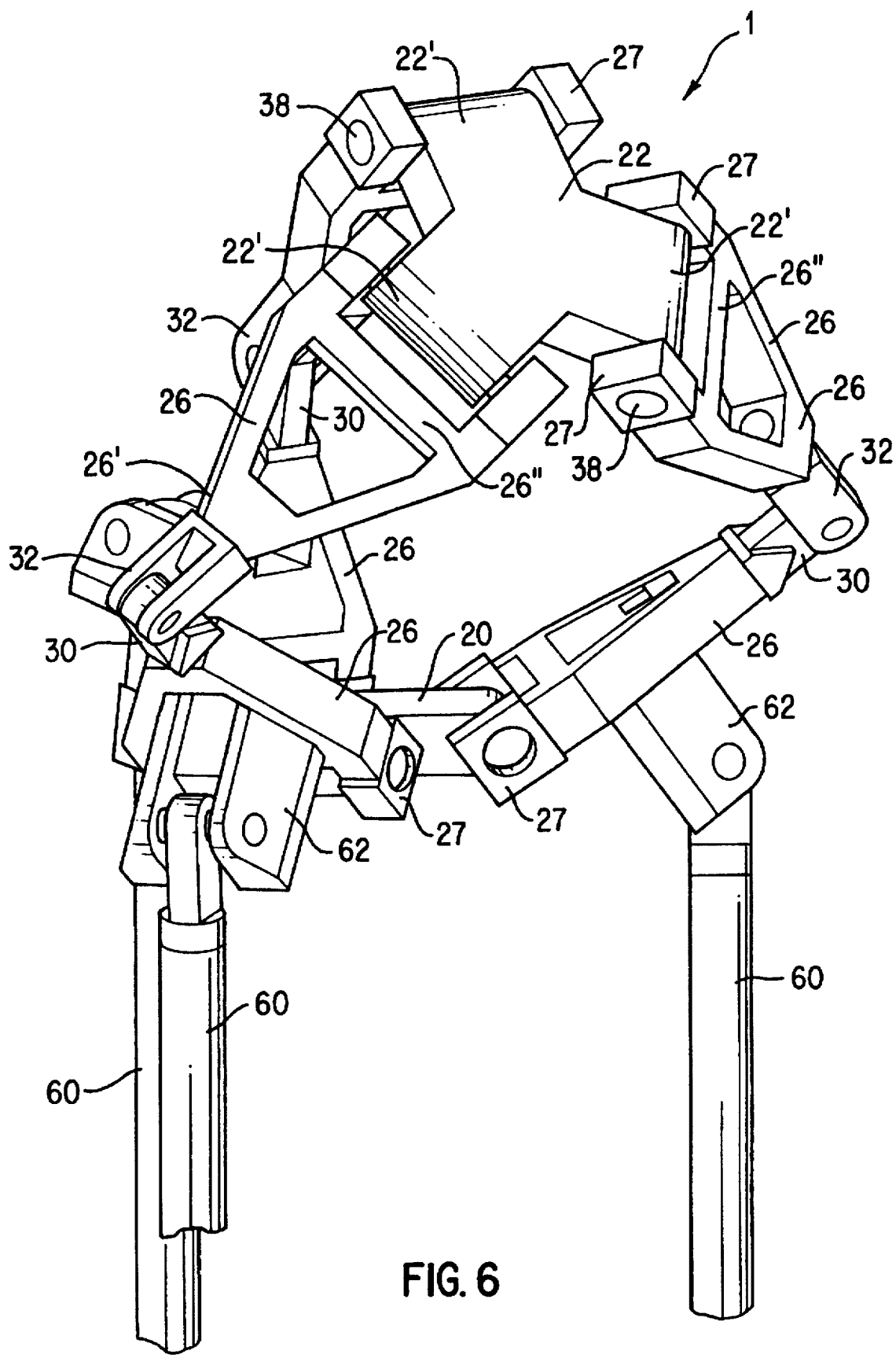
FIG. 6 illustrates the embodiment of the present invention shown in FIG. 5 wherein the wrist is viewed from a second position.
Figure 7:
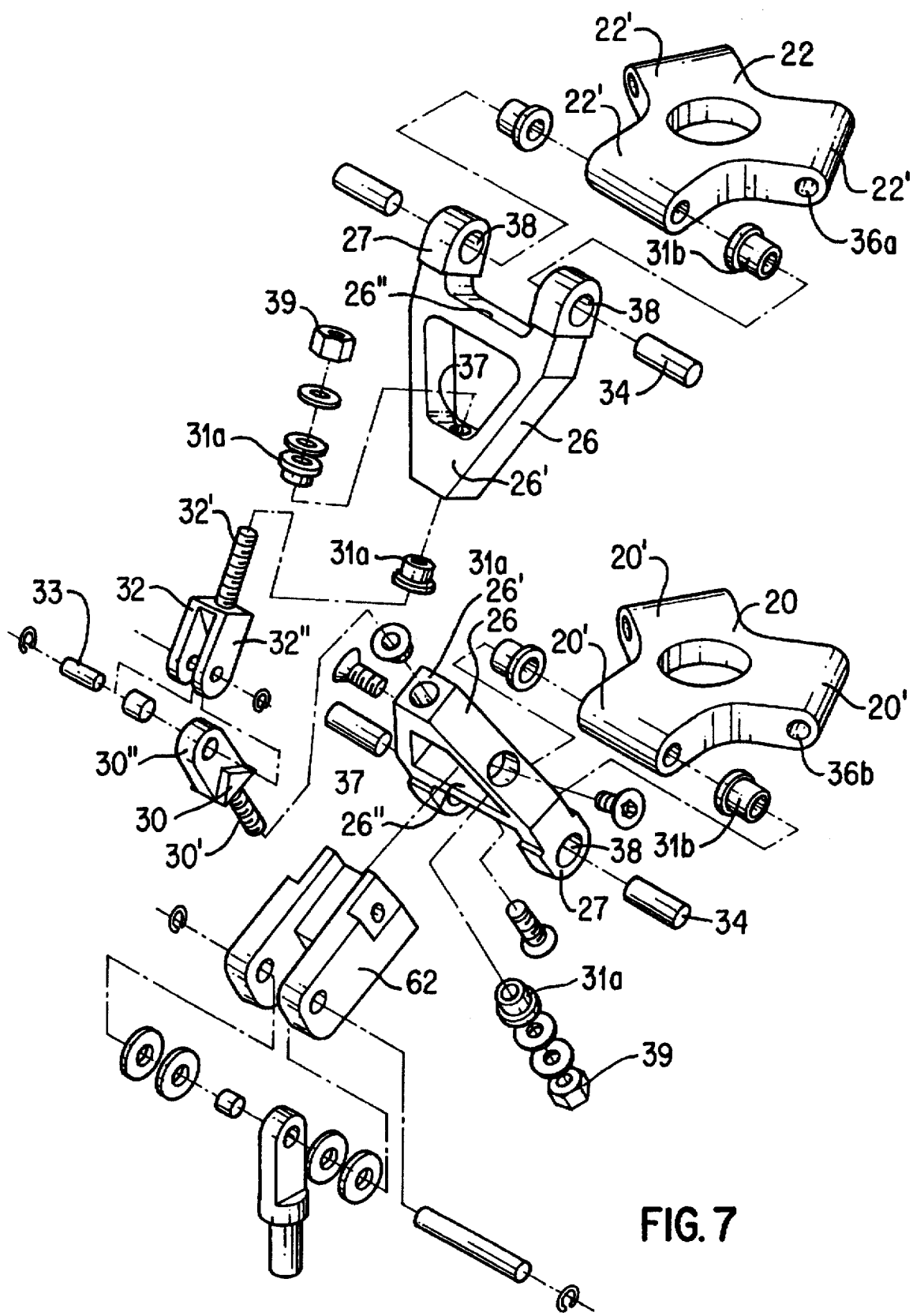
FIG. 7 illustrates an exploded perspective view showing the various components of one embodiment of the present invention shown in FIGS. 5 and 6.

Referring to FIGS. 5 and 6, the robotic Carpal wrist of the present invention includes a basal plate 20 and a distal plate 22 spaced apart and connected by three parallel chains 24 of links 26 called legs. Each of the chains 24 of links 26 comprise two links 26, the link connected to the basal plate called the basal leg and the link connected to the distal plate called the distal leg, connected together by a mid-joint 28 allowing three degrees-of-freedom between the links 26. The three degree of freedom mid-joint 28 between the basal and distal leg links 26 comprises a basal mid-joint 30 and a distal mid-joint 32, as best seen in FIGS. 5 and 7. Basal mid-joint 30 includes an axial cylindrical rod portion 30' and a shank portion 30", as shown in FIG. 7. Distal mid-joint 32 also includes an axial cylindrical rod portion 32' and a shank portion 32", as shown in FIG. 7.

Shank portion 32" of distal mid-joint 32 comprises two axially extending parallel plates joined together by a transverse plate across first ends of the parallel plates. Axial cylindrical rod portion 32' is joined at right angles to the center of the transverse plate and extends in the opposite direction from the parallel plates. The two parallel plates are spaced apart a distance sufficient to allow for shank 30" of basal mid-joint 30 to fit with sliding clearance between the parallel plates. Shank 30" of basal mid-joint 30 comprises a single axially extending plate joined at a first end to axial cylindrical rod portion 30'. A transverse bore is provided through second ends of the parallel plates of shank 32" and through the second end of shank 30" such that a pivot pin 33 can be passed through the transverse bores in shank 32" and shank 30" with shank 30" in between the parallel plates of shank 32" in order to pivotally connect basal mid-joint 30 to the distal mid-joint 32.

Axial cylindrical rod portion 30' of basal mid-joint 30 extends collinear with the longitudinal axis of a first linking member 26, the basal leg, in each of the three parallel chains 24 of links 26 and is pivotally attached to the linking member for rotation about the longitudinal axis. Likewise, axial cylindrical rod portion 32' of distal mid-joint 32 extends collinear with the longitudinal axis of a second linking member 26, the distal leg, in each of the three parallel chains 24 and is pivotally attached to the linking member for rotation about the longitudinal axis. Basal mid-joint 30 and distal mid-joint 32 are pinned together by pivot pin 33 whose axis is perpendicular to the axes of cylindrical portions 30' and 32'. Each of the three parallel chains 24 of links 26 in robotic wrist 1 comprises two links 26 joined together by a three degree-of-freedom mid-joint 28 comprising said basal mid-joint 30, and said distal mid-joint 32, and said pivot pin 33.

The end of the link 26 opposite from the end pivotally attached to basal mid-joint 30 is pivotally attached to a radially extending lobe 20' of basal plate 20, as shown in FIGS. 5 and 7, thus forming a revolute basal joint. Likewise the end of the link 26 opposite from the end pivotally attached to distal mid-joint 32 is pivotally attached to a radially extending lobe 22' of distal plate 22, thus forming a revolute distal joint. Basal plate 20 includes three radially extending lobes 20' angularly spaced from each other by 120 degrees. Likewise, distal plate 22 includes three radially extending lobes 22' angularly spaced from each other by 120 degrees. The radially outermost ends of each of lobes 22' have a full-length transverse bore 36a and the radially outermost ends of each of lobes 20' have a full-length bore 36b, as shown in FIG. 7.

In a preferred embodiment, each of the linking members 26 is triangular in longitudinal cross section, as best seen in FIG. 7. A vertex 26' of each link 26 is provided with an axial bore 37 for pivotal engagement with either the axial cylindrical portion 30' of basal mid-joint 30 or the axial cylindrical portion 32' of distal mid-joint 32. The base 26" of each link 26 opposite from vertex 26' is provided with axially extending flanges 27, which are spaced apart by a distance equal to the width of lobes 22' of distal plate 22 or lobes 20' of basal plate 20. Pins or stub shafts 34 pass through transverse holes 38 in flanges 27 and enter bores 36a and 36b through the radially outermost ends of lobes 22' or 20', respectively. Linking members 26 are thus pivotally attached to either basal plate 20 or distal plate 22 by a basal joint or a distal joint, respectively, with a single degree of rotational freedom allowed between either basal plate 20 or distal plate 22 and the associated linking member 26.

Three degrees of rotational freedom are allowed at each of the mid-joints 28 between linking members 26. The center of each mid-joint 28 is defined by the intersection of the axis of rotation of basal mid-joint 30 about its cylindrical portion 30', the axis of rotation of distal mid-joint 32 about its cylindrical portion 32' and the axis of rotation between basal mid-joint 30 and distal mid-joint 32 about pivot pin 33.

A method of pivotal attachment between basal mid-joint 30 and distal mid-joint 32 and associated links 26 is to pass threaded cylindrical portions 30' and 32', respectively, through flanged bearings 31a that are seated in axial bores 37 through the vertices of respective links 26. Basal mid-joints 30 and distal mid-joints 32 are retained by the threaded engagement of hex nuts 39 with the ends of cylindrical portions 30' and 32', respectively. Likewise, a method of pivotal attachment of the base side of each link 26 to either basal plate 20 or distal plate 22 to form the basal joints and distal joints, respectively, is to provide flanged bearings 31b in bores 38 through flanges 27, and to pass pins or stub shafts 34 through flanges 27 and flange bearings 31b into bores 36b and 36a through the radially outermost ends of lobes 20' and 22', respectively.

Although the preferred embodiment is described using triangular cross section links 26, it is understood that links 26 could assume a variety of different cross sections as long as the distance from the center of mid-joints 28 to the pivot axes at the connections to basal plate 20 and the distal plate 22 remain constant.

Figure 4:
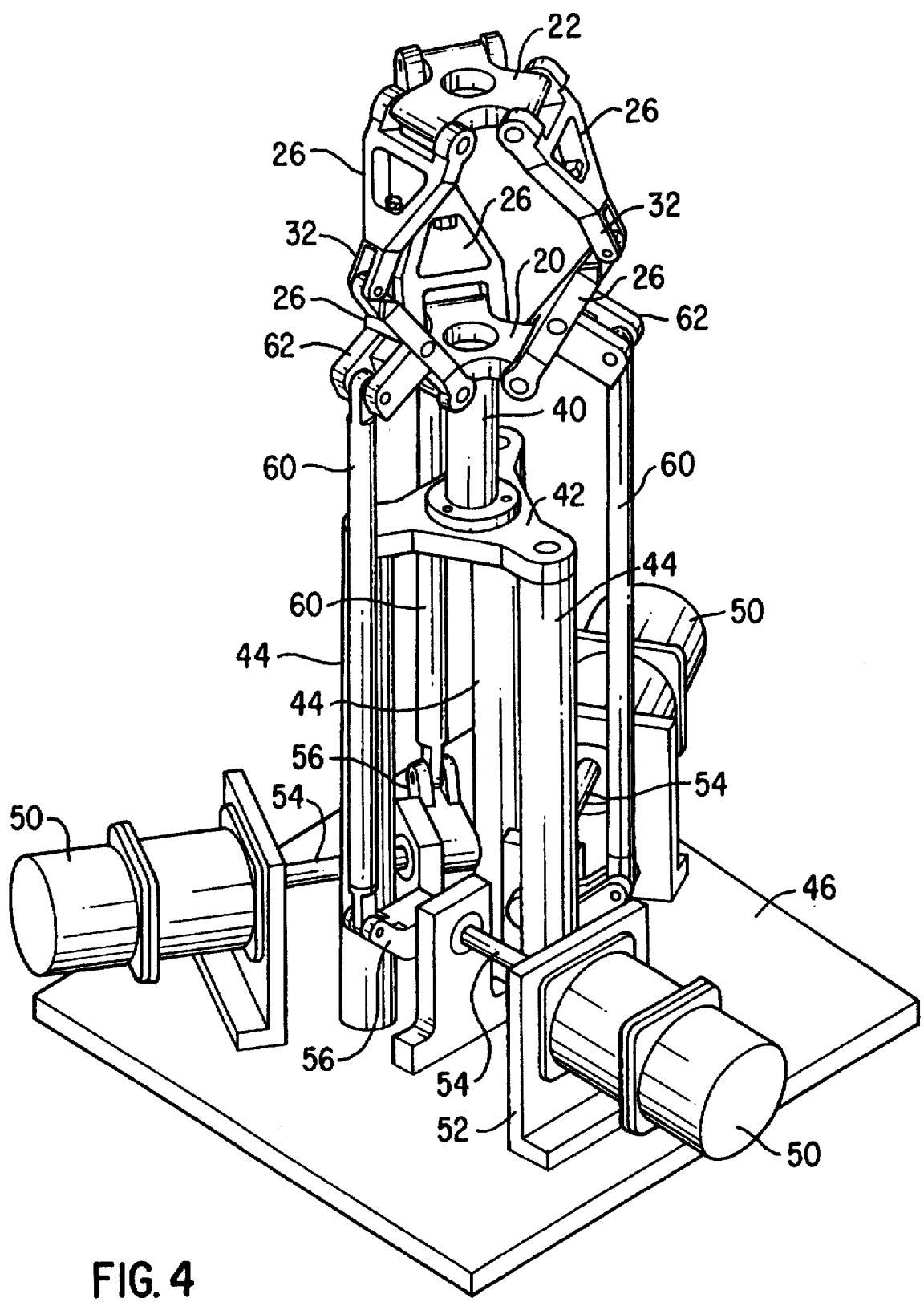
FIG. 4 illustrates one embodiment of the present invention wherein the basal plate of the robotic Carpal wrist is supported by ground support columns, which represent a robot arm, extending perpendicular to a ground support plate on which the three actuators for controlling movement of the wrist are mounted.

Controlled pivotal movement of each of the links 26 connected to basal plate 20 can be achieved in a variety of ways. In one embodiment, as shown in FIG. 4, basal plate 20 is supported on a intermediate column 40, which is supported on an intermediate support plate 42, which is in turn supported by three support columns 44. Support columns 44 extend upward from a support plate 46 and are parallel to each other. Three actuators 50 are mounted on support plate 46 by support angles 52, with drive shafts 54 of actuators 50 intermittently rotating or oscillating about their axes during actuation of actuators 50. Intermittent rotation or oscillation of drive shafts 54 is converted to reciprocation of connecting rods 60 through cranks 56 that are fixed at one end to drive shafts 54 and at the opposite end are pivotally connected to connecting rods 60. The ends of connecting rods 60 opposite from the ends pivotally connected to cranks 56 are pivotally connected to inserts 62. Inserts 62 are fixed to links 26 at a point displaced from the pivotal connection between links 26 and basal plate 20. Reciprocation of connecting rods 60 results in the pivoting of links 26 relative to basal plate 20, and movement of distal plate 22 through the three chains 24 of links 26.

The robotic Carpal wrist 1 is capable of producing pitch and yaw motions in excess of 180 degrees combined with a third plunging motion upon actuation of actuators 50. The pitch and yaw motions are angular motions of the distal plate. The plunging motion is movement of the distal plate toward and away from the basal plate along the primary axes of the wrist, with the plunge distances designated as $P_d$ in FIG. 3. Because the plunging motion creates control challenges, complicating potential integration of the wrist and robot arm control algorithms, in most industrial applications the degree-of-freedom provided by this plunging motion may be held fixed. The plunge motion may be constrained, thus simplifying the control algorithm required for operation, by coupling the control of the actuators through the control algorithms, or by physically coupling the device such that only angular motions pitch and yaw may occur.

Figure 1:
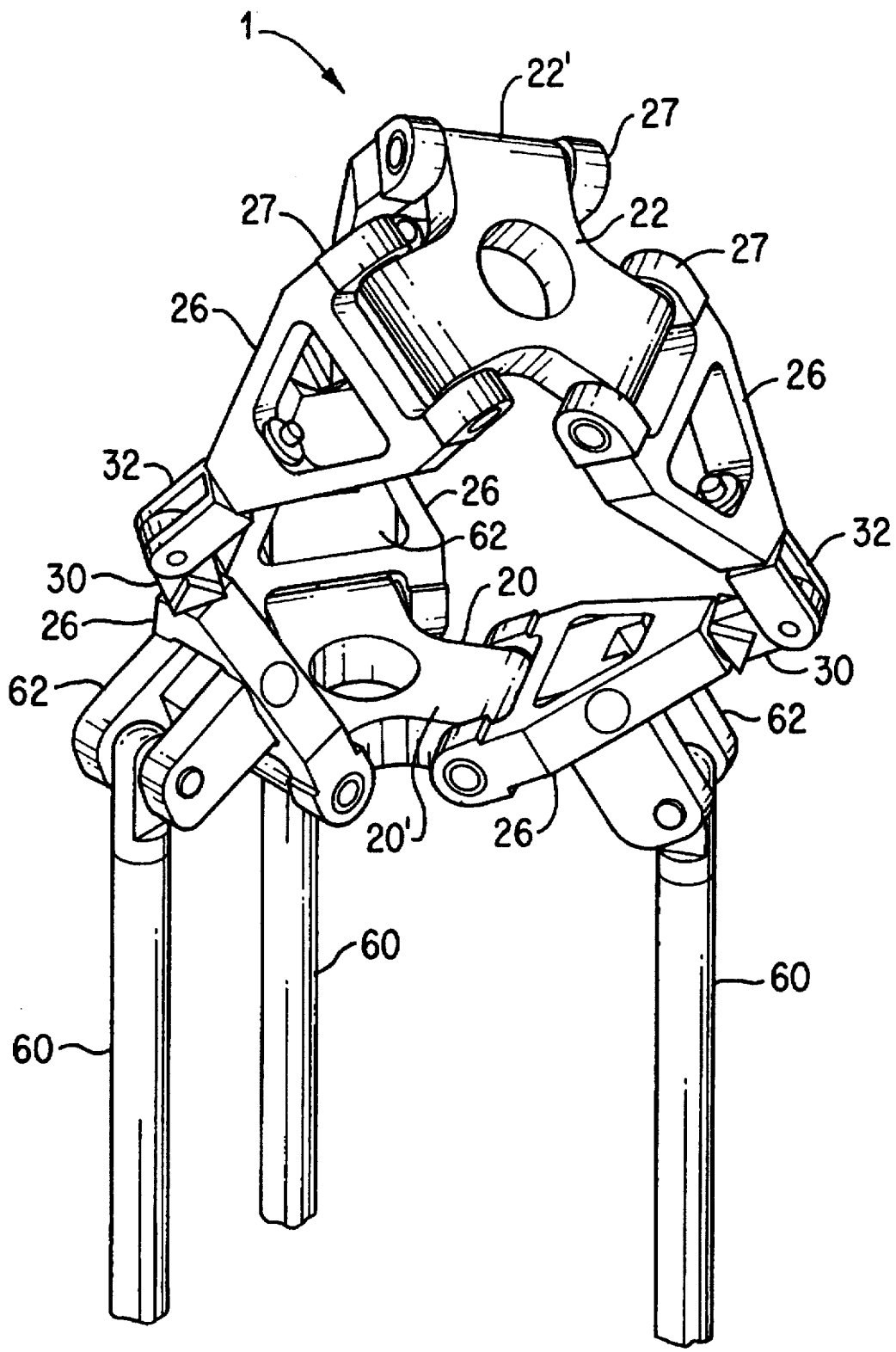
FIG. 1 illustrates a conceptual design of one embodiment of the robotic Carpal wrist of the present invention in a first deflected position, and isolated, showing only the wrist, and a portion of the actuating means.
Figure 2:
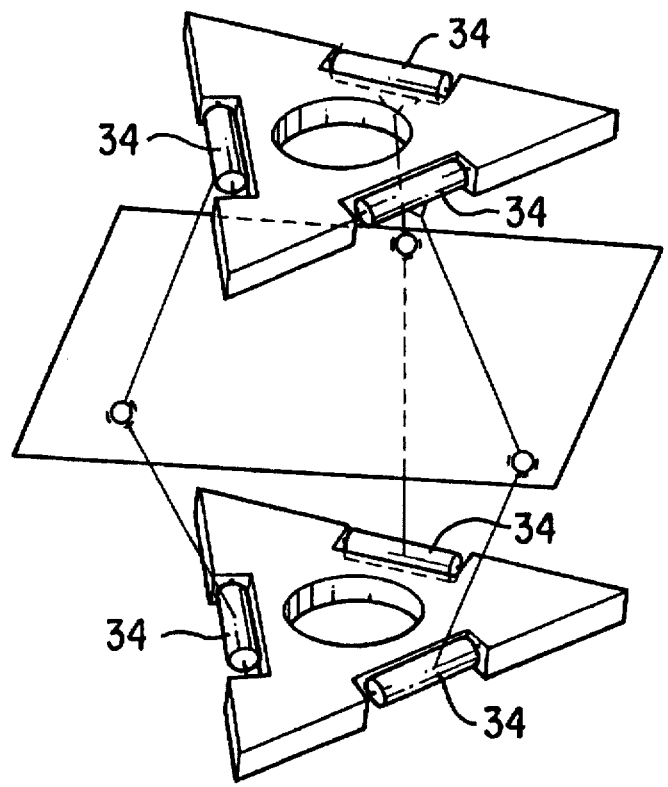
FIG. 2 is a kinematic diagram of one embodiment of the robotic Carpal wrist of the present invention showing the mid-plane defined by the three mid-joints of the wrist.
Figure 3:
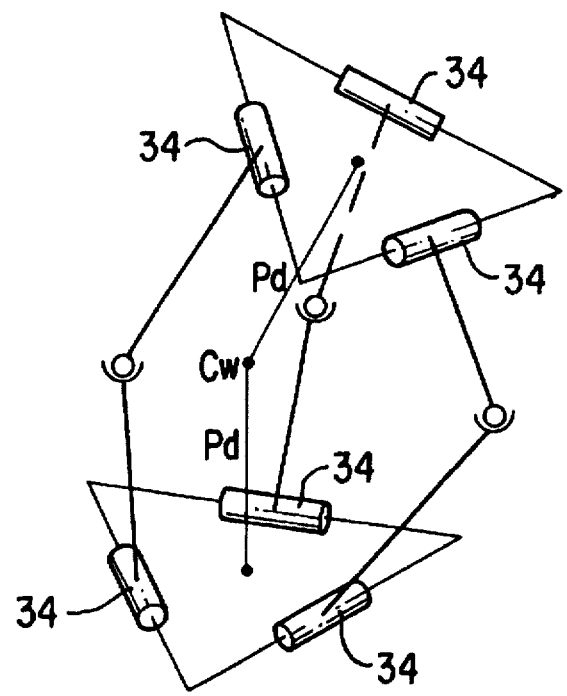
FIG. 3 is a kinematic diagram of one embodiment of the robotic Carpal wrist of the present invention with the basal revolute joints actuated such that the distal plate has assumed a first, flexed position, and with a diagrammatic representation of the center of the wrist, and the plunge distance shown.

The geometric center of the wrist $C_w$ is defined as the intersection of lines drawn perpendicular to the basal and distal plates and extending from center points on both plates. The distance from the geometric center $C_w$ to either the distal plate or the basal plate is equal to the plunge distance $P_d$ as shown in FIG. 3. While the geometric center does not necessarily lie on any physical part of the wrist, it is important because, in the spherically constrained mode (when the plunge motion is constrained), the motion of the distal plate describes a sphere of radius $P_d$ about the geometric center of the wrist.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Modifications and variations of the above-described embodiments of the present invention are possible, as appreciated by those skilled in the art in light of the above teachings. For example, the links can assume a variety of geometric configurations as long as they are all of equal length, the structure of the mid-joints between the links can be varied as long as the mid-joints allow three degrees-of-freedom between the links, the structure of the basal joints and the distal joints can be varied as long as they allow a single degree-of-freedom between the links and the basal plate and distal plate, respectively, and the form of actuation may be of any type that by some means controls the angle of rotation of the links that connect to the basal plate.

It is therefore to be understood that, within the scope of the appended claims and their equivalents, the invention may be practiced otherwise than as specifically described.

What is claimed is:

1. A device for the movement and positioning of an element in space, comprising:

a basal plate;

a distal plate;

six linking members, each having two ends and being of substantially equal length;

a first three of said linking members each being connected at one end to said basal plate by a basal joint allowing a single degree-of-freedom, and at an opposite end to one of a second three of said linking members by a mid-joint allowing three degrees-of-freedom, said mid-joint comprising a plurality of revolute joints; and each of said second three of said linking members being connected at one end to said distal plate by a distal joint allowing a single degree-of-freedom.

2. The device of claim 1 wherein:

the axes of rotation of said basal joints intersect to form a triangle; and the axes of rotation of said distal joints intersect to form a triangle.

3. The device of claim 1 wherein:

said mid-joints each comprise three revolute joints having co-intersecting axes of rotation, with the center of each mid-joint being defined as the intersection of said co-intersecting axes of rotation.

4. The device of claim 3 wherein:

said centers of said mid-joints lie on a mid-plane of said device with said device being symmetrical about said mid-plane.

5. A robotic Carpal wrist comprising:

a base member;

a distal member;

three basal linking members pivotally attached via basal pivoting structures to said base member at first ends of said basal linking members with said basal pivoting structures allowing a single degree-of-freedom between each of said basal linking members and said base member;

three actuators mounted in fixed relationship relative to said base member and being connected to said three basal linking members for pivoting said basal linking members about pivot axes of said basal linking members;

three connecting members, with each of said connecting members being pivotally attached to a corresponding one of said three basal linking members at a second end of said corresponding basal linking member, the connecting members each comprising a plurality of revolute joints; and said three connecting members each being pivotally attached to a corresponding distal linking member at a second end of said corresponding distal linking member, first ends of said distal linking members being pivotally attached via distal pivoting structures to said distal member, with said distal pivoting structures allowing a single degree-of-freedom between each of said distal linking members and said distal member.

6. The robotic Carpal wrist of claim 5 wherein:

said connecting members each comprise three revolute joints having co-intersecting axes of rotation.

7. The robotic Carpal wrist of claim 5 wherein:

each of said actuators comprises a crank arm, means for providing a rotational driving force to said crank arm, and a connecting rod connected between said crank arm and one of said three basal linking members.

8. The robotic Carpal wrist of claim 7 wherein:

said connecting members each comprise three revolute joints having co-intersecting axes of rotation.

9. The robotic Carpal wrist of claim 5 wherein:

said basal linking members and said distal linking members are substantially equal in length.

10. The robotic Carpal wrist of claim 9 wherein:

pivot axes of said basal pivoting structures between, said three basal linking members and said base member intersect to define an equilateral triangle, and pivot axes of said distal pivoting structures between said three distal linking members and said distal member intersect to define an equilateral triangle.

11. The robotic Carpal wrist of claim 9 wherein:

said base member and said distal member each comprise three radially projecting lobes with the radially outer end of each lobe having a transverse bore therethrough and said transverse bores receiving therein pivot pins connected to said three basal linking members and said three distal linking members, respectively.

12. The robotic Carpal wrist of claim 11 wherein:

at least one of said linking members is substantially triangular.

13. A method for moving and positioning an element in space using a device that includes;

a basal plate and a distal plate, six linking members, each having two ends and being of substantially equal length, a first three of said linking members each being connected at one end to said basal plate by a basal joint allowing a single degree-of-freedom, and at an opposite end to one of a second three of said linking members by a mid-joint allowing three degrees-of-freedom, said mid-joint comprising a plurality of revolute joints; and each of said second three of said linking members being connected at one end to said distal plate by a distal joint allowing a single degree-of-freedom, the method comprising:

mounting the element to the distal plate, and moving and positioning the element by driving at least one of the linking members.

14. The method of claim 13, wherein the step of moving and positioning includes the step of moving and positioning the element to at least one preset location.

15. The method of claim 13, further comprising the step of connecting the basal plate to a platform.

16. The method of claim 13, further comprising the step of connecting the basal plate to a fixed platform.

17. The method of claim 13, further comprising the step of locking the basal plate in a fixed position.

18. The method of claim 13, further comprising the step of configuring the basal plate as part of a platform.

19. The method of claim 13, further comprising the step of configuring the basal plate as part of a fixed platform.

* * * * *